United States Patent [19]

Forrest

[11] Patent Number: 5,806,592

[45] Date of Patent: Sep. 15, 1998

[54] DRILLING COMPLETION, AND WORKOVER FLUID COMPRISING GROUND PEANUT HULLS

[76] Inventor: Gabriel T. Forrest, Bering Place II, 800 Bering, Suite 301, Houston, Tex. 77057

[21] Appl. No.: 747,625

[22] Filed: Nov. 13, 1996

[51] Int. Cl.$^6$ .............................. C09K 7/02; E21B 21/00; E21B 33/138; E21B 43/34
[52] U.S. Cl. ........................... 166/267; 166/294; 175/66; 175/72; 507/104; 507/204
[58] Field of Search ..................... 166/292, 294, 166/283, 267; 175/66, 72; 507/104, 204

[56] References Cited

U.S. PATENT DOCUMENTS

| | | | |
|---|---|---|---|
| 2,815,079 | 12/1957 | Goins, Jr. et al. | |
| 5,076,944 | 12/1991 | Cowan | 507/104 |
| 5,087,611 | 2/1992 | Forrest | 507/104 |
| 5,102,866 | 4/1992 | Forrest | 507/104 |
| 5,118,664 | 6/1992 | Burts, Jr. | 175/72 X |
| 5,147,852 | 9/1992 | Cowan et al. | 175/72 X |
| 5,211,250 | 5/1993 | Kubena, Jr. et al. | 175/72 |
| 5,229,018 | 7/1993 | Forrest | 166/283 X |
| 5,246,602 | 9/1993 | Forrest | 166/283 X |

*Primary Examiner*—George A Suchfield
*Attorney, Agent, or Firm*—Arthur F Zobal

[57] ABSTRACT

Ground peanut hulls in the range of −150 to 250 standard size mesh are mixed with a viscosifier and added to a fluid for circulation in a borehole during drilling, completion and workover operations. Below 250 standard sieve mesh the ground peanut hulls are distributed in a range down to 700 standard sieve mesh, with some of the ground peanut hulls having a size less than 700 standard sieve mesh.

22 Claims, No Drawings

DRILLING COMPLETION, AND WORKOVER FLUID COMPRISING GROUND PEANUT HULLS

BACKGROUND OF THE INVENTION

1. Field of the Invention

The invention relates to a sealing agent of ground peanut hulls.

2. Description of the Prior Art

U.S. Pat. Nos. 5,102,866; 5,087,611 and 5,229,018 disclose the use of ground peanut hulls in a drilling, completion and workover fluid to be circulated in a borehole. These patents are incorporated in this application by reference. U.S. Pat. No. 5,229,018 discloses that the peanut hulls may be ground to a fine size with the optimum size being between 20 to 200 standard sieve mesh for the best sealing to be achieved. In drilling and completion and workover operations, shale shaker screens having a mesh size of between 30 to 325 standard sieve mesh are used to remove the earth cuttings to prevent them from being recirculated. Most shaker screens now in use have a screen size of 80 to 225 standard sieve mesh. The problem is that most of the shaker screens used also remove much of the ground peanut hulls if most of them are larger than 150 standard sieve mesh and ground peanut hulls have to be continually added to the fluid to achieve the desired sealing in the borehole.

In addition it is standard that all gravel packs have fine screens downhole at the production zone. It is detrimental to plug these screens.

All horizontal wells have mud motors and measuring while drilling (MWD) tools. All coil tubing drilling systems also have mud motors. In order to prevent mud motors and MWD tools from plugging, up all seepage material must be very fine.

SUMMARY OF THE INVENTION

It is an object of the invention to provide a sealing agent of ground peanut hulls with a viscosifier in a fluid to be circulated in a borehole for drilling, completion, or workover purposes. The ground peanut hulls have a size such that a useful amount of the ground peanut hulls will pass the shaker screens normally used thereby allowing the ground peanut hulls to stay in the fluid of the system as the fluid is circulated.

In the embodiment disclosed, a large percentage of the ground peanut hulls have a size between the range of −150 to +250 standard sieve mesh such that they will pass most of the known shaker screens used and some of the ground peanut hulls of the invention will pass all of the shaker screens used to remove the cuttings in the fluid. In addition the fine ground peanut hulls of the invention minimizes plug up the gravel pack screens, mud motors and MWD tools.

BRIEF DESCRIPTION OF THE DRAWINGS

DESCRIPTION OF THE PREFERRED EMBODIMENT

The ground peanut hulls of the invention have a size between the range of −150 to 250 standard sieve mesh with some having a size less than 700 standard sieve mesh. More than 50% of the ground peanuts are within the range of −150 to 250 standard sieve mesh with ground peanut hulls distributed in substantially all mesh sizes from 150 to 700 standard sieve mesh with some having sizes less than 700 standard sieve mesh. They are mixed with a viscosifier to carry and suspend the ground peanut hulls. In one embodiment 6 to 30 pounds of the ground peanut hulls per 42 gallon barrel are mixed with a drilling, completion or workover fluid. The amount of viscosifier used may be one to 5 pounds per barrel. Thus a barrel of the fluid has 6 to 30 pounds of ground peanut hulls in a mesh size of −150 to 700 standard sieve mesh and a viscosifier of one to 5 pounds per barrel. Reference is made to U.S. Pat. No. 5,229,018 for description of various viscosifiers that may be used and for descriptions of various drilling, completion, or workover fluids that the ground peanut hulls may be mixed with.

In forming the ground peanut hulls sealing agent, the peanut meats and skins are removed before grinding takes place. During grinding sizing is carried out such that the final ground peanut hulls used are within the range of −150 to 700 standard sieve mesh with some being finer than 700 mesh. The ground peanut hulls then are mixed with a viscosifier and the resulting product mixed with the drilling, completion, or workover fluid. Thus during drilling, workover, or completion of an oil, gas, water, or mineral well, as the slurry or fluid is circulated in the borehole and as the fluid passes the uphole shaker screen, the earth cuttings will be retained on the screen but most or much of the ground peanut hulls in the fluid will pass the screen and be recirculated in the borehole.

The ground peanut hulls and viscosifier in dry form may be premixed and stored in sacks and then mixed with the fluid at the well site to form the slurry.

In order to complete an oil, gas or mineral well and place it into production, certain steps are essential, and other steps are desirable.

The essential steps are these: First, a bore hole must be drilled through a permeable rock formation containing the hydrocarbon or mineral to be produced; such rock formation is called the reservoir.

Second, a fluid must be circulated in order to remove the rock being drilled and to remove the sediments from formations previously drilled that fall into the hole and settle to the bottom; these sediments will greatly interfere with completion and production procedures by forming a mud cake against the reservoir as fluid seeps into the permeable formation.

Third, wireline tools, production tubing, packers, and pumps, if any, must be placed into the reservoir portion of the hole, without getting stuck in the mud cake on the bore hole walls.

Fourth, the density of the completion fluid is lowered so that the hydrostatic pressure that has kept the well from blowing out during the completion procedures, now allow reservoir hydrocarbons or minerals to flow into the bore hole and be produced.

Fifth, the lighter completion fluid is circulated past the reservoir in such a manner that the mud cake that has formed against the rock and prevented fluid from entering the formation is now washed clear, so that it does not interfere with the well production.

The desirable steps are these: First, the fluid being circulated should have a low fluid or seepage loss into the permeable reservoir rock. Usual materials to control this also seal the rock and interfere with the flow of hydrocarbon or mineral into the bore hole when production is attempted.

The second desirable step is to use fluid loss or seepage control materials that seal temporarily, but do not seal permanently.

The key word in both the essential and desirable steps of completion is that the completion fluid must be circulated.

Viscosified completion fluid containing the ground peanut hulls will seal and prevent seepage only while the hydrostatic pressure in the bore hole is greater than the pressure in the reservoir rock, thereby preventing the well from blowing out with uncontrolled production, and also preventing permeability damage due to fluid seepage into the reservoir rock.

However, when production tubing and tools are in place and production is attempted by circulating a less dense fluid past the reservoir rock, such that the pressure in the reservoir is greater than the hydrostatic pressure in the bore hole, the seal formed by the fine ground peanut hulls is broken, and the material disperses back into the completion fluid being circulated, and is cleaned off the surface wall of the reservoir rock.

For drilling purposes, the drilling fluid may be water, brine, or oil, in which the ground peanut hulls and viscosifier are mixed. Circulation of the fluid in the bore hole for drilling purposes may be carried out as disclosed in U.S. Pat. No. 2,815,079. A surface pump is usually employed to pump the fluid through the drill pipe. For completion or workover purposes, the circulating fluid may be water, brine, or oil, in which the ground peanut hulls and viscosifier are mixed. Circulation of the resulting mixture in the bore hole may be carried out by a surface pump for pumping the fluid through a pipe inserted into the bore hole. The fluid will flow out of an opening at the lower end of the pipe and back through the annular space between the pipe and the bore hole. In these operations, a shale shaker screen is located uphole through which the fluid is passed before being recirculated to take out the cuttings to prevent them from being recirculated.

The most convenient way to prepare a completion fluid is to supply the ingredients in dry form that can be added in appropriate concentrations to water or brine for make up at rig site locations.

For effective sealing of rock permeability, the ground peanut hulls are combined with a suitable viscosifier, in a ratio such that both proper rheological and sealing properties result at a reasonable concentration of the final material.

Non-Clay Based Product: For a fluid non-damaging to reservoir rock's permeability, a non-clay based viscosifier such as Xanthan gum may be used. This viscosifier is relatively expensive.

Clay Based Product: For preparation of a clay-based viscosifier, the ratio of ground peanut hulls and viscosifier is entirely different.

Bentonite is a water hydratable smectic inorganic clay, predominately sodium or calcium montmorillonite, both which may also contain upwards to 40% micas, kaolinites, silicates. My invention may be used with these, but the ratio of ground peanut hulls sealing agent to clay viscosifier has to be adjusted, depending on the clay type used, and the sensitivity of the subject formation to permeability damage.

In between the cost of the very expensive Xanthan gum/ground peanut hulls sealing agent combination and the very cheap clay/ground peanut hull sealing agent combination is a wide variety of other possible combinations.

The selection of which viscosifier/sealing agent combination depends on the Theological and fluid loss properties desired for the particular well operation and specific rock formation being completed, reworked, or drilled, and the salt composition of the make-up water.

In some cases, certain salts must be used to obtain a calculated water activity in order to match the water activity of the subject formation. In such cases, the viscosifier selected for use with the ground peanut hulls must be compatible with the ionic nature of the salts being used to match rock connate water activity.

Commonly used salts are Chlorides of sodium, calcium, potassium, and zinc; sodium bromide are sometimes used. When such salts are used, the preferred viscosifier may be a water-soluble polymer selected from the group of carboxymethylcellulose, hydroxyethylcellulose, hydroxypropyl guar, and commercial homologues of such polymers.

In these concentrated salts slurries, if it is desired to use a cheap viscosifier/sealing agent combination, my invention may be formulated using fuller's earth, zeolitic clays, or attapulgite clay, which do not hydrate, but will provide the suspending qualities to carry the sealing agent.

Logistics and availability are also important factors in remote international locations. In cases where this is an important factor, if fresh or brine water can be used, then other water-soluble polymers, such as polyacrylates, polyacrylamide, or partially hydrolyzed polyacrylamide, polyvinylacetates and maleic anhydrides, may be used.

If solids, sand, or sloughing shale is a problem during the workover, completion, or drilling operations, than the viscosifiers with the ground peanut hulls may be water-soluble polymers: Either a partially hydrolyzed polyacrylamide, or a polyoxyethylene; the selection of which material will be dictated by the salt content of the water, economics, and chemical flushes or fracturing fluids planned. The polyoxyethylene is the most inert to salts and any chemical flush that is to be used, but the polyacrylamide is usually the most readily obtainable.

As can be seen from the above detailed discussion on completion fluid formulations of my invention, the concentration of the viscosifier/sealing agent combination can range from about six per barrel of the mixture upwards to 30 pounds per barrel. This versatility is a great advantage of my invention, as it allows completion, workover, and drilling engineer to design not only the best fluid technically, but also the most cost effective fluid for the application at hand, and materials available within his logistical restraints.

I claim:

1. A method of carrying out operations wherein a fluid is circulated in a borehole extending into the ground, comprising the steps of:
   taking peanut hulls which have been ground to a size range of −150 to 250 standard sieve mesh,
   adding said ground peanut hulls to said fluid, and circulating said fluid in said borehole.

2. The method of claim 1, wherein:
   said peanut hulls are ground to a size range such that more than 50% of said peanut hulls are within the size range of −150 to 250 standard sieve mesh.

3. The method of claim 2, wherein:
   a portion of said ground peanut hulls are distributed in a size range of −250 to 700 standard sieve mesh.

4. The method of claim 3, wherein a shaker screen is located above said borehole, said method comprising the steps of:
   passing said fluid including at least most of said ground peanut hulls in said fluid through said screen and
   recirculating said fluid and ground peanut hulls in said borehole.

5. An oil, gas, water, or mineral well slurry to be circulated in a borehole, comprising:
   a sealing agent of ground peanut hulls having a particle size within the range of −150 to 250 standard sieve mesh and a viscosifier to carry and suspend said ground peanut hulls, said sealing agent and said viscosifier being present in said slurry at a concentration of about 6 to 30 pounds per 42 gallon barrel of said slurry.

6. The slurry of claim 5, wherein:

said peanut hulls are ground to a size range such that more than 50% of said peanut hulls are within the size range of −150 to 250 standard sieve mesh.

7. The slurry of claim 6, wherein:

a portion of said ground peanut hulls are distributed in a size range of −250 to 700 standard sieve mesh.

8. The method of claim 1 wherein: said ground peanut hulls are distributed in substantially all of said mesh sizes from 150 to 250 standard sieve mesh.

9. The method of claim 2, wherein: said ground peanut hulls are distributed in substantially all of said mesh sizes from 150 to 250 standard sieve mesh.

10. The method of claim 3, wherein: said ground peanut hulls are distributed in substantially all of said mesh sizes from 150 to 700 standard sieve mesh.

11. The slurry of claim 5, wherein: said ground peanut hulls are distributed in substantially all of said mesh sizes from 150 to 250 standard sieve mesh.

12. The slurry of claim 6, wherein: said ground peanut hulls are distributed in substantially all of said mesh sizes from 150 to 250 standard sieve mesh.

13. The slurry of claim 7, wherein: said ground peanut hulls are distributed in substantially all of said mesh sizes from 150 to 700 standard sieve mesh.

14. The method of claim 1, wherein:

substantially all of said ground peanut hulls have a mesh size of less than 150 standard sieve mesh.

15. The method of claim 2, wherein:

substantially all of said ground peanut hulls have a mesh size of less than 150 standard sieve mesh.

16. The method of claim 10, wherein:

substantially all of said ground peanut hulls have a mesh size of less than 150 standard sieve mesh.

17. The slurry of claim 5, wherein:

substantially all of said ground peanut hulls have a mesh size of less than 150 standard sieve mesh.

18. The slurry of claim 6, wherein:

substantially all of said ground peanut hulls have a mesh size of less than 150 standard sieve mesh.

19. The slurry of claim 13, wherein:

substantially all of said ground peanut hulls have a mesh size of less than 150 standard sieve mesh.

20. A method of carrying out operations wherein a fluid is circulated in a borehole extending into the ground, comprising the steps of:

taking peanut hulls which have been ground to a size range of less than 150 standard sieve mesh such that substantially all of said ground peanut hulls have a mesh size of less than 150 standard sieve mesh, adding said ground peanut hulls to said fluid, and circulating said fluid in said borehole.

21. An oil, gas, water, or mineral well slurry to be circulated in a borehole, comprising:

a sealing agent of ground peanut hulls having a particle size of less than 150 standard sieve mesh and a viscosifier to carry and suspend said ground peanut hulls, wherein substantially all of said ground peanut hulls have a mesh size of less than 150 standard sieve mesh.

22. The slurry of claim 21, wherein:

said sealing agent and said viscosifier are present in said slurry at a concentration of about 6 to 30 pounds per 42 gallon barrel of said slurry.

* * * * *